United States Patent
Schoenberg et al.

(10) Patent No.: US 7,840,964 B2
(45) Date of Patent: Nov. 23, 2010

(54) MECHANISM TO TRANSITION CONTROL BETWEEN COMPONENTS IN A VIRTUAL MACHINE ENVIRONMENT

(75) Inventors: Sebastian Schoenberg, Hillsboro, OR (US); Volkmar Uhlig, White Plains, NY (US)

(73) Assignee: Intel Corporation, Santa Clara, CA (US)

(*) Notice: Subject to any disclaimer, the term of this patent is extended or adjusted under 35 U.S.C. 154(b) by 1334 days.

(21) Appl. No.: 11/322,455

(22) Filed: Dec. 30, 2005

(65) Prior Publication Data

US 2007/0169120 A1    Jul. 19, 2007

(51) Int. Cl.
G06F 9/455 (2006.01)
G06F 21/00 (2006.01)
G06F 9/26 (2006.01)
H04L 29/06 (2006.01)

(52) U.S. Cl. ............... 718/1; 711/6; 711/202; 713/166

(58) Field of Classification Search ............ 718/1; 711/6, 202; 713/166
See application file for complete search history.

(56) References Cited

U.S. PATENT DOCUMENTS

| | | | |
|---|---|---|---|
| 7,137,126 B1 * | 11/2006 | Coffman et al. | 719/328 |
| 7,430,630 B2 * | 9/2008 | Boyd et al. | 710/316 |
| 2005/0172305 A1 * | 8/2005 | Baumberger | 719/327 |
| 2006/0130060 A1 * | 6/2006 | Anderson et al. | 718/1 |

OTHER PUBLICATIONS

Rich Uhlig et al., "Intel Virtualization Technology", Computer, IEEE Computer Society, vol. 38, No. 5, pp. 48-56, May 2005.
Intel Corporation, "Intel® Virtualization Technology Specification for the Intel® Itanium® Architecture (VT-i)," Revision 2.0, Document No. 305942-002, 100 pages, Apr. 2005.
Intel Corporation, "Intel® Virtualization Technology Specification for the IA-32 Intel® Architecture," Document No. C97063-002, 144 pages, Apr. 2005.
Andrew V. Anderson et al., U.S. Appl. No. 11/008,911, entitled "System and Method to Deprivilege Components of a Virtual Machine Monitor," filed Dec. 10, 2005.

* cited by examiner

Primary Examiner—Kenneth Tang
(74) Attorney, Agent, or Firm—Joni D. Stutman

(57) ABSTRACT

In some embodiments, the invention efficiently manages, sets up, controls and performs communication between isolated components using portals. In a platform having virtualization architecture, a component in a first virtual machine requests a service to be performed by a component in a second virtual machine. A privileged system layer validates the ability to create a communication portal between the two components. The validation is a two-level validation to ensure that a portal is permitted between the two components and that the requested activity is also permitted. Other embodiments are described and claimed.

12 Claims, 3 Drawing Sheets

MECHANISM TO TRANSITION CONTROL BETWEEN COMPONENTS IN A VIRTUAL MACHINE ENVIRONMENT

CROSS-REFERENCE TO RELATED APPLICATIONS

This application is related to co-pending U.S. patent application Ser. No. 11/008,911, entitled, "System And Method to Deprivilege Components of a Virtual Machine Monitor," filed on Dec. 10, 2004 by Andrew V. Anderson, et al., assigned to a common assignee.

FIELD OF THE INVENTION

An embodiment of the present invention relates generally to computing in a virtual machine architecture environment and, more specifically, to efficiently manage, set up, control and perform communication between isolated components using portals.

BACKGROUND INFORMATION

Various mechanisms exist for managing execution in platforms with virtual machine environments. Existing systems tend to utilize a virtual machine monitor (VMM) to control and manage various virtual machines or guests on a platform. The VMM may be implemented with varying levels of security and control of the system resources. Communication between and among various components on a platform, while maintaining high security, can be problematic.

One platform management technique is to deploy a virtual machine monitor (VMM) on the system. There are two common architectures for virtual machine monitors. The first is a hypervisor architecture, in which a privileged hypervisor (virtual machine monitor) controls all other software in a system. The hypervisor must contain native drivers and models for all devices which it wishes to provide to software running in virtual machines (VMs) (referred to herein as guest VMs). This necessity has been a problem with this architecture of VMM. In the hypervisor architecture, the VMM has full control over the underlying platform, and may limit guest VM access to the platform hardware. The hypervisor has access to all of the hardware. A guest VM may directly access the hardware only if the hypervisor permits it. A hypervisor system may prevent guest VMs from accessing the hardware directly, if designed to do so. When the hypervisor is implemented, device drivers for each physical device must also be implemented. If the physical device changes (e.g., it is replaced by a different version of the device) then a new or replacement device driver must be present in the hypervisor. Typically, all operating systems run in VMs. The VMs may be privileged in different ways. For example, VM1 may have access to device #1 while VM2 has access to device #2.

The second common architecture for a VMM is a hosted VMM. In this architecture, the VMM is tied intimately to a hosting operating system (OS) and uses the services provided by the hosting OS to perform its virtualization functions. In this architecture, the hosting OS has full control over the platform; the VMM component has control of the platform's guest VMs. In other words, the VMM component does not directly control the underlying hardware. The VMM accesses the underlying hardware using the services provided by the hosting OS. The stability of the VMM is only as good as that of the hosting OS. The hosting OS contains all of the necessary device drivers. The VMM must implement models for all devices presented to the guest VMs. VMMs implemented with this high-level architecture suffer portability constraints because of their reliance on a particular hosting OS. Additionally, there is a reliance on the hosting OS to perform scheduling. The VMM controls scheduling of the guest VMs, but it does not control how much time it is given by the hosting OS. For instance, it may not be possible to request that the hosting OS awaken the VMM every millisecond.

Some virtualization products exist today. For instance, a hypervisor-based architecture, ESX Server, is available from VMware®, Inc. Microsoft® and VMware®, Inc. both provide host-based architecture software: Microsoft offers VirtualPC and VirtualServer, and VMWare® offers VMWorkstation and GSX Server. Currently, these software systems may be loaded on a server or personal computer (PC) that does not have hardware virtualization support.

Conventional operating systems often provide several mechanisms for applications or components to communicate with each other. Typical examples for these mechanisms are shared memory, pipes, messages or mail-boxes. To implement any security policy on top of these mechanisms, they must be extended to control communication; the two most common methods here are access controls and capabilities.

Permission can be checked at two places: at the time when a communication channel is created, modified or deleted, or secondly, every time communication takes place. Often, the checks are expensive and the only acceptable place where the impact on the communication bandwidth is limited is when a channel is modified. However, this requires that all communication channel control structures have to be maintained by the operating system.

Existing systems either do not control communication or have a very expensive rights management that is fundamental part of the host operating system. While the first case does not allow users to build a secure system, the second case has strong limitation in terms of flexibility or scalability.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to efficient management, set up, control of communication between isolated components on a platform. In at least one embodiment, the present invention is intended to use portals to control communication between and among components on a platform architecture comprising a virtual machine technology.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Existing systems are comprised of a monolithic kernel code that allows different parts of the system to communicate with each other directly. However, there may be advantages in terms of reliability and security and other factors to componentize, or break up the system into smaller components. The components may be developed independently and are controlled independently. Specific methods are required to call each component. With this architecture, remote procedure calls are typically used to invoke functionality that is implemented in different components.

In a componentized system, many function calls may be distributed to various components. The function calls cannot be called directly, as in legacy systems, but the component must be called to request a specific service. A mechanism of transition between components has been used in systems designed on micro-kernels. Interprocess communication is typically used for components to communicate with one another. Interprocess communication may use mailboxes, messages, etc. Each component has an identifier which is used to address the communication. The micro-kernel may be called to request transferring some data to the component with the target identifier.

Data in the communication request contains which function is to be called and associated parameters. The destination component handles the request and transfers results of the function to the calling component. This is also called a client-server relationship.

Figure 1:
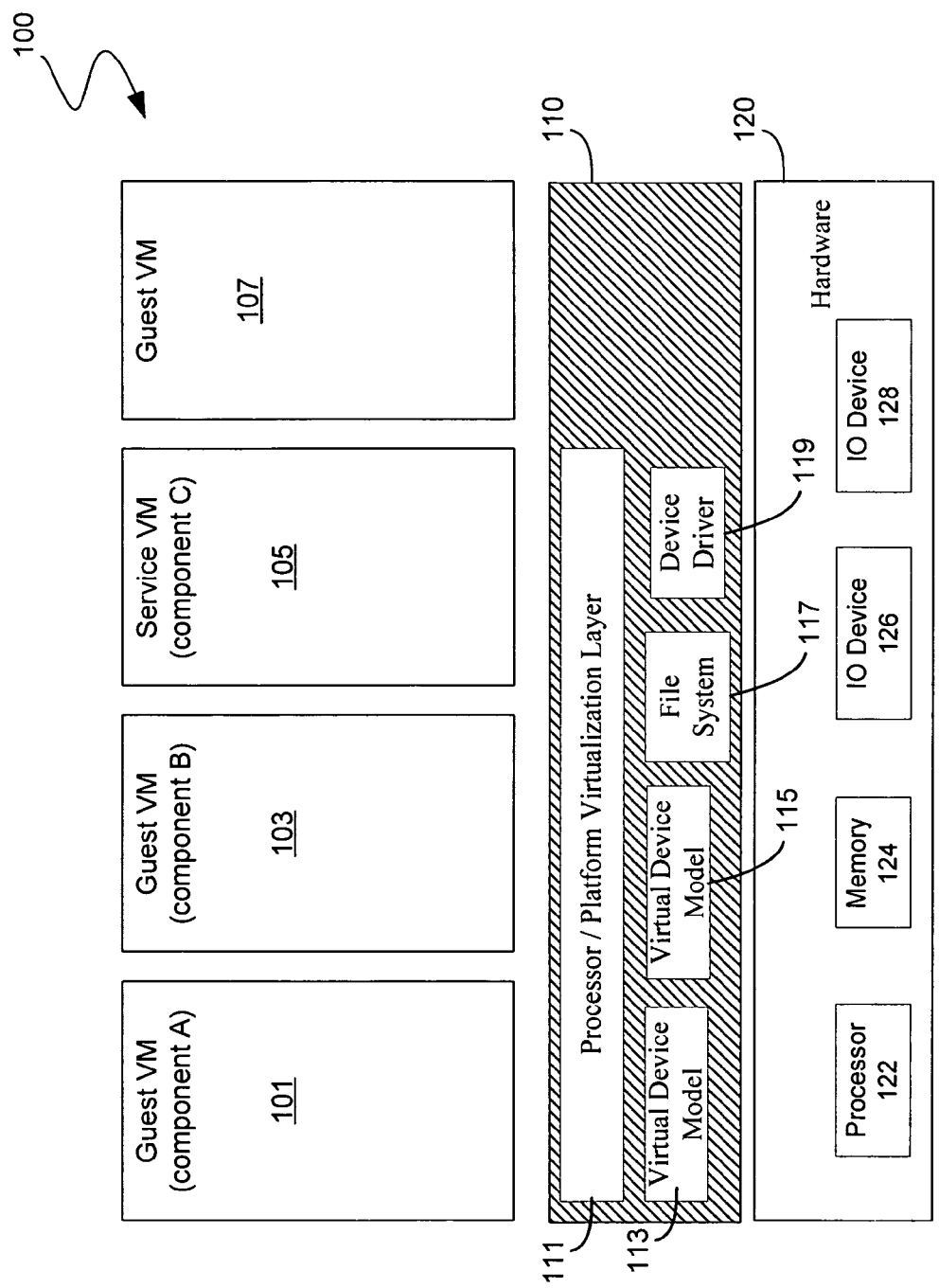
FIG. 1 is a block diagram illustrating a traditional hypervisor virtual machine monitor (VMM) architecture platform.

FIG. 1 is a block diagram illustrating a traditional hypervisor virtual machine monitor (VMM) architecture platform 100, as may be used with embodiments of the invention. A number of guest virtual machines (VMs) 101, 103, 105, and 107 may be running on the platform 100 at the same time. A virtual machine monitor (VMM) 110 controls the guest VMs' access to the hardware 120 via the processor/platform virtualization layer 111. A number of virtual device models 113 and 115 may exist within the VMM 110. The VMM 110 may operate at the highest privilege level. The VMM 110 controls access to the file system 117, memory and all devices, as discussed further below. The VMM 110 typically has a device driver 119 for each hardware device on the platform.

The VMM 110 and guest VMs 101, 103, 105 and 107 execute on platform hardware 120. The platform hardware 120 may include a processor 122, memory 124 and one or more I/O devices 126 and 128. The platform hardware 120 may be a personal computer (PC), mainframe, handheld device, portable computer, set top box, or any other computing system.

Processor 122 may be any type of processor capable of executing software, such as a microprocessor, digital signal processor, microcontroller, or the like. Though FIG. 1 shows only one such processor 122, there may be one or more processors in platform hardware 120 and one or more of the processors may include multiple threads, multiple cores, or the like.

Memory 124 may be a hard disk, a floppy disk, random access memory (RAM), read only memory (ROM), flash memory, or any other type of medium readable by processor 122. Memory 124 may store instructions for performing the execution of method embodiments of the present invention.

The one or more I/O devices 126 and 128 may be, for example, network interface cards, communication ports, video controllers, disk controllers on system buses (e.g., Peripheral Component Interconnect (PCI), Industry Standard Architecture (ISA), Advanced Graphics Port (AGP)), devices integrated into the chipset logic or processor (e.g., real-time clocks, programmable timers, performance counters), or any other device on the platform hardware 120. The one or more I/O devices 126 and 128 may be accessed through I/O instructions, or memory mapped I/O accesses or through any other means known in the art.

In a traditional way, a VMM may be monolithic to handle all virtualization events of a guest. If the guest tries to communicate with a device, the VMM is invoked and the VMM handles the request by communicating directly with the physical device or emulating the device using a virtual device. In an exemplary VM system, a small privileged VMM called a "microhypervisor" does not handle device requests, but routes the requests to another VM component, returns results and passes control back to the VM.

Embodiments of the present invention enable VMs to pass control directly to one another without requiring control by the VMM. One component executes an instruction that causes a virtualization event, for instance on an IA32 platform this could be an OUT instruction that requires interaction with a device model or a CPUID instruction to inform software in a VM about available features of the (virtual) processor. Information identifying that the VM has caused a virtualization event is to be sent to the component that can handle the event. Discussed below is an exemplary mechanism for the microhypervisor to pass the request and information to the other component and how the connection between the components is set up.

The service is to be performed by another component or microhypervisor. The other component may be a service OS running in a VM, but not the microhypervisor or privileged system layer.

Embodiments of the invention may be based on two basic primitives: local names for components and mutual agreement to connect two communication endpoints, called portal connectors to form a channel.

Using global names in a system means that every component in the system has a unique name. Each component's unique name operates in the same namespace. It is analogous to a state name. Each state in the U.S. has a unique name. Local names are analogous to city names which are local to the states. For instance, there is a Portland, Oreg. and a Portland, Me. The microhypervisor, or privileged system layer, provides the translation from local name to global name and if applicable, vice versa.

Each component knows the communication partner only by a local name which is translated by the privileged system layer into a globally unique name. If and only if both communication partners have local names for each other, i.e., they know one another, they can successfully establish a portal. To setup or configure a portal, the components directly modify the data structure describing the portal connector. Since the security-relevant name translation information is protected in the privileged layer, a privileged component need not be invoked to set up the portal communications. In conventional systems, to set up a connection, a call must be made to a system service. Since this data structure is provided by the component and also resides in user-accessible memory, modifications can be made quickly and without costly interactions with the privileged system layer.

Each component has its own set of portal connectors which are present at a known area in the component's address space. Modifying memory mapped to this area automatically means modifying the portal connectors. Since the layout of the portal connectors is known, components with access to this memory can directly negotiate and form communication channels with each other.

Figure 2:
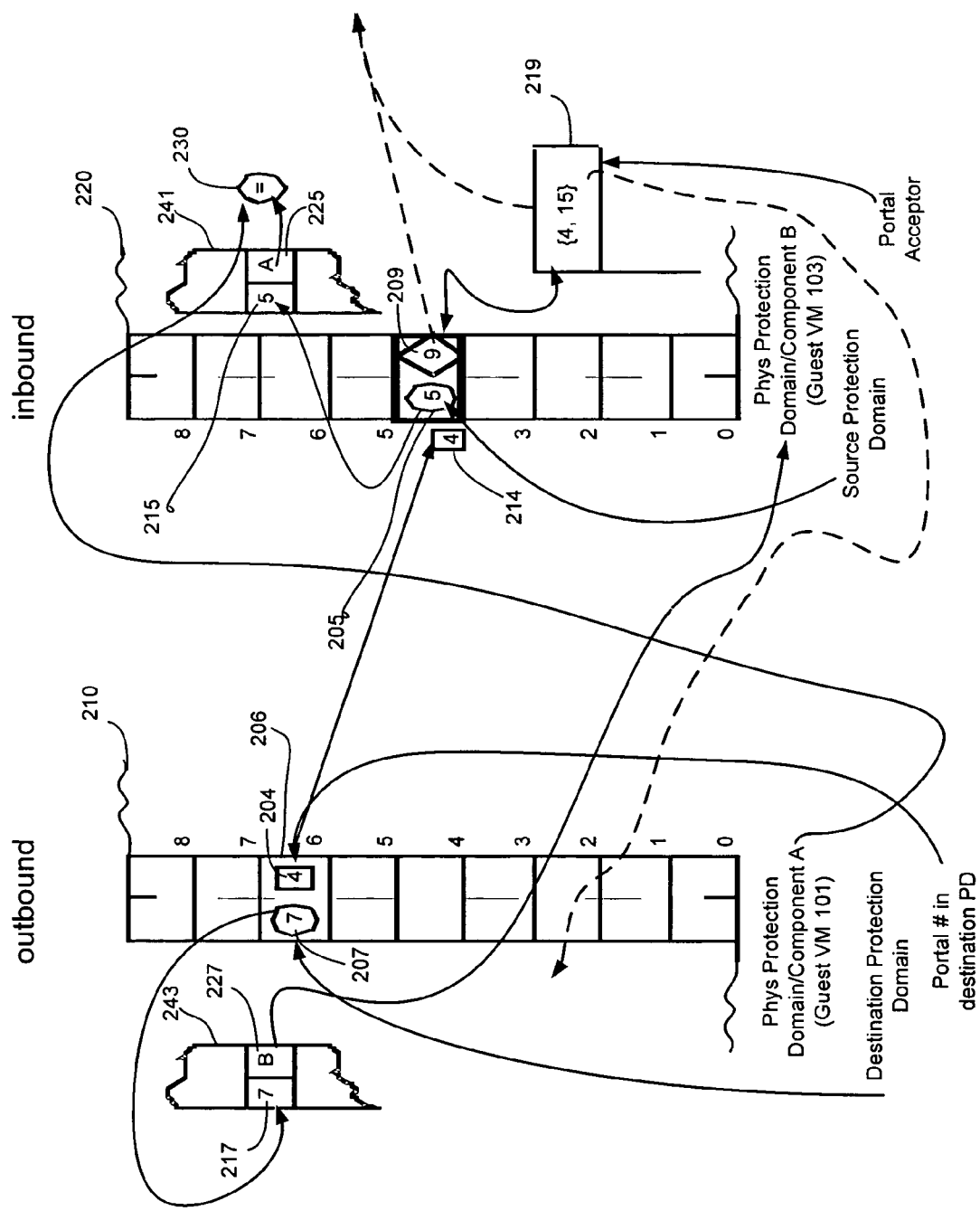
FIG. 2 is a block diagram illustrating the data structures and local to global name translations of inbound and outbound portal descriptors according to an embodiment of the invention.

Referring now to FIG. 2, there is shown a block diagram illustrating an outbound domain A 210 for a first component and an inbound domain B 220 for a second component of the system. In this example, the outbound domain A 210 represents an array of source portal connectors 0-8 and the inbound domain B represents an array of destination portal connectors 0-8. On the sending side of a communication channel, an outbound portal connector 206 specifies the destination portal end point 214 and the destination component is expressed as a local name 4 (204) for an inbound portal connector 4 (214). On the receiving side of a communication channel, the channel end point data structure specifies the source component 205 (expressed as a local name in the scope of the receiver) that is allowed to enter through this portal. A user-managed identifier called portal validator or acceptor (219) is used to perform a final per-communication check.

If component A (210) wants to send information to component B (220), then the first data structure 206 must be modified to identify the end point of the second component. For the second component B to accept the information, the appropriate data structure (205) of the second component 220 must be modified to show that the first component is an authorized source. This negotiation is necessary to allow the components to communicate. Since the communication end point data structures are located in virtual memory, a setup where no physical memory is mapped to this area is equivalent to a setup with a non-present source or destination name and no communication with this component is possible.

A component may initiate a traversal across a portal by invoking a service in the privileged system layer. The processor running the first component transfers the requested information to the second component while "traveling" through the portal to continue execution in the other component. While the requested information is always transferred, it is optional whether execution follows the portal or not. The sending component calls the privileged system layer. In this exemplary embodiment, the microhypervisor (privileged component) is called VX2. In one embodiment, the implementation separates data and control transfer. It is thus possible to leave the processor in the source domain and send only the information. This implementation may be more flexible in some cases.

This service may be invoked in a variety of manners, similar to the mechanisms by which operating system services may be invoked by a user-level process. In an exemplary implementation executing on a platform enabling virtualization technology, the component executes an IA32-specific VT-x instruction "VMCALL" to cause a VMEXIT to the privileged system layer (i.e., microhypervisor). Additionally, all VT-x based VMEXITs cause a portal traversal to inform the appropriate component about the occurrence of a virtualization event that needs to be handled.

Figure 3:
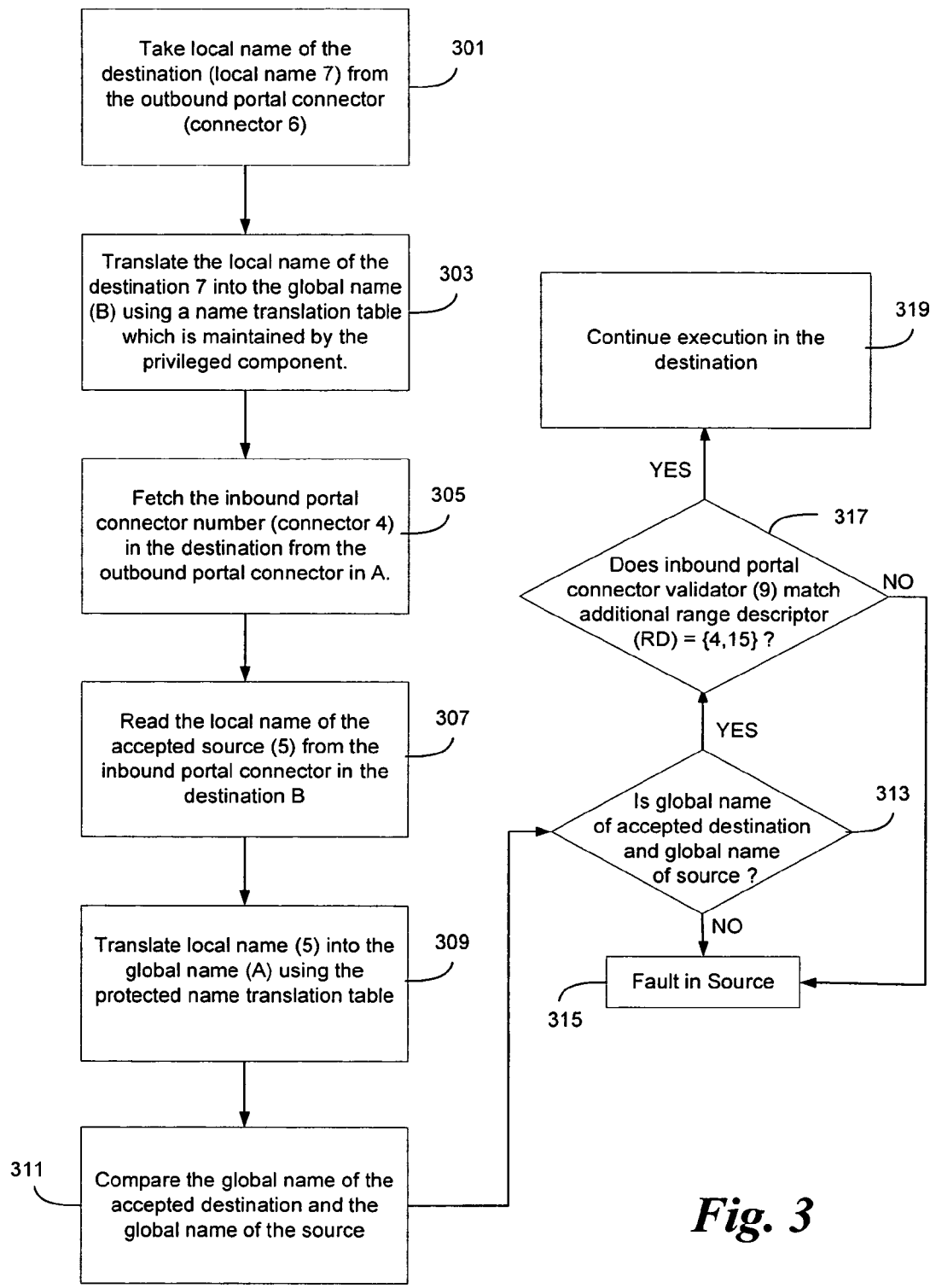
FIG. 3 is a flow diagram illustrating a method for initiating portal communication between two components, according to an embodiment of the invention.

FIG. 2 depicts graphically the process of FIG. 3, which is performed by the privileged component upon invocation of the mechanism to traverse a Portal. When component A attempts to communicate to component B, a VM call to the microhypervisor is placed and the microhypervisor performs the translation to the global name B 227. The privileged system layer has access to the data structures of each component. The local name 7 of the destination 207 is retrieved by the privileged component at block 301 from the outbound portal connector 6 (206).

The local name 7 of the destination 207 is then translated into the global name B (227) using a name translation table (243) which is maintained and only accessible by the privileged component, at block 303. Global name B 227 points to the Domain B 220. The translation table is in protected memory and not directly accessible to the deprivileged components.

It should be noted that each domain, or component, will have both outbound portal arrays and inbound portal arrays. For simplicity, only one inbound and one outbound array are shown in FIG. 2.

The inbound portal connector number 4 (204) in the destination field 206 is fetched by the microhypervisor from the outbound portal connector 206 in domain A 210 at block 305. Thus, the contents of the outbound portal destination 206 comprise both a representation of the domain, or component, as well as a pointer or index 214 into the inbound portal array 220 for domain B.

The local name of the accepted source 5 (205) is read from the inbound portal connector data 224 in the destination domain B at block 307. The local name 5 (205 and 215) is translated into the global name A 225 using the protected name translation table 241 of domain B at block 309.

The global name of the sender (A) and the global name of the accepted source (A) are compared with the portal data in the respective data structures at 311/313. Portal entry into the destination domain B is permitted only when these two names match, otherwise a fault in the source domain is raised at 315.

If the compare operation permits entrance into domain B, a second check is performed on the receiver side that considers the activity (or processor) that attempts to traverse the portal. In an environment with multiple activities, this allows the receiver to permit entrance only for selected activities. In one embodiment, the inbound portal connector's validator 9 (209) may be checked against an additional range descriptor (RD) in the destination's protected execution control structure 219 (for example, a thread-control block) at block 317. In the example case, the validator 9 (209) is checked against an RD={4, 15} (219) that would permit entry because it allows entrance for all portals with a validator in the range from 4 to 15. It will be apparent to one of skill in the art that other validation schemes may be devised and used, with no loss of functionality.

If the validation permits entrance into domain B, as determined in block 317, data is transferred into domain B, and if requested by the sender, execution is continued in the destination component block 319. If entrance is rejected, no data is transferred and a fault is raised in the source component at block 315.

There is a distinct advantage of having two levels of validation or checking. The first check verifies that the source domain A is generally permitted to access the destination domain B. The second range check enables a validation of activity. For instance, source domain A may be permitted to execute services in domain B for only a subset of possible activities. This further validation provides added security to the portal communication scheme.

For instance, suppose a system comprises two components in a system with two processors. Component A (virtual machine A) may execute using both processors. Component B can handle only one processor. Since component A may communicate with component B, component A could let both of its processors attempt to initiate portal communication with component B. However, since component B is not running a multi-processor capable operating system, it would not know what to do with the second processor of component A. Therefore, portal communication between component A and component B must be limited to activities from only one processor of component A. The range validation can effect this limitation.

To control communication on a per-portal basis, each connector may contain an additional descriptor. One representation of an inbound/outbound connector descriptor is a bit field where each bit represents an individual item that can be transferred. Typical items are (a) the integer register set, (b) the floating-point register set, (c) control registers, (d) references to resources such as memory, or (e) references to other domains through local names. References to resources such as memory allow protection domains to share resources such as main memory. References to global domains through local names establish a local-name mapping to a protection domain in the receiver for which the sender already has a local name. While the outbound connector descriptor defines which information can leave the sender side, the inbound connector descriptor specifies which information can enter the destination side of the communication endpoint. The privileged systems component transfers only the information where outbound and inbound descriptors permit the transfer. This allows a component to prevent the leakage of secret or unnecessary state from one entity to another but also allows the receiver to protect itself from being corrupted by a component sending malicious or incorrect information.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
a privileged system layer in a virtualization enabled platform enabling a communication portal for executing a service requested by a first component, between the first and a second component of the platform, wherein the first component executes in a first virtual machine on the platform and the second component executes in a second virtual machine on the platform;

performing validation by the privileged system layer that the second component is authorized to execute at least one service on behalf of the first component, further comprising:
- retrieving a portal index and local name for the second component from an outbound portal connector descriptor of the first component,
- translating the local name for the second component into a global name for the second component using a using a name translation table maintained by the privileged system layer,
- retrieving an inbound portal connector descriptor comprising a local name for a source component from the second component, the second component associated with the portal index and translated global name for the second component,
- translating the local name for the source component into a global name for the source component using a using a name translation table maintained by the privileged system layer,
- comparing the translated global name for the source component to the global name for the first component to ensure a match; and
- validating by the privileged system layer that the second component is authorized to execute the requested service, further comprising:
  - comparing a portal validator to an activity descriptor to ensure that the requested service is authorized, wherein the activity descriptor comprises a range descriptor.

2. The method as recited in claim 1, further comprising:
- requesting a portal connection by the first component to a service in the second component; and
- when the privileged system layer validates the portal communication, executing the requested service by the second component.

3. The method as recited in claim 1, wherein each component has access to a data structure comprising authorized inbound and outbound portal descriptors,
- wherein the outbound portal descriptor further comprises a local destination component name and an index, the local destination component name and index corresponding to an inbound portal descriptor in a source component, and
- wherein the inbound portal descriptor further comprises a local source component name and a portal validator, the local source component name corresponding to an authorized source component and the portal validator corresponding to an authorized activity.

4. The method as recited in claim 3, wherein the performing validation by the privileged system layer, further comprises translating both the source and destination local names using a name translation table, the name translation table being inaccessible to deprivileged components.

5. A system comprising:
- at least one processor residing on a virtualization enabled platform, the platform having a privileged component, the platform to run a plurality of non-privileged components, each of the plurality of components to run in a virtual machine (VM) on the platform;
- a plurality of data structures stored in memory, each data structure accessible to the privileged component and to a corresponding non-privileged component to describe authorized communication portals for the corresponding non-privileged component; and
- a name translation table stored in memory, the name translation table accessible to the privileged component and inaccessible to the non-privileged components,
- wherein the privileged component is to perform a 2-level validation of a requested communication portal between a first non-privileged component and a second non-privileged component, wherein the 2-level validation further comprises:
  - a first validation that the first component and second component have an authorized communication portal, and
  - a second validation that a service requested of the second component, by the first component, is an authorized service request for the authorized communication portal,
  - wherein to perform the second validation, the privileged component is to compare a portal validator to an activity descriptor to ensure that the requested service is authorized, and wherein the activity description comprises a range descriptor.

6. The system as recited in claim 5, wherein to perform the first validation, the privileged component is to retrieve a portal index and local name for the second component from an outbound portal connector descriptor of the first component, translate the local name for the second component into a global name for the second component using a using a name translation table maintained by the privileged component, retrieve an inbound portal connector descriptor comprising a local name for a source component from the second component, the second component associated with the portal index and translated global name for the second component, translate the local name for the source component into a global name for the source component using a using a name translation table maintained by the privileged component, and compare the translated global name for the source component to the global name for the first component to ensure a match.

7. The system as recited in claim 5, wherein the description of authorized communication portals in the data structure for the corresponding non-privileged component comprises authorized inbound and outbound portal descriptors, wherein the outbound portal descriptor further comprises a local destination component name and an index, the local destination component name and index corresponding to an inbound portal descriptor in a source component, and wherein the inbound portal descriptor further comprises a local source component name and a portal validator, the local source component name corresponding to an authorized source component and the portal validator corresponding to an authorized activity.

8. The system as recited in claim 5, wherein the 2-level validation to be performed by the privileged component further comprises translating both a source local name and a destination local name using the name translation table.

9. A machine readable storage medium having instructions stored thereon that when executed by a privileged system layer running on a processor in a virtualization enabled platform cause the platform to:
- enable a communication portal for executing a service requested by a first component, between the first and a second component of the platform, wherein the first component executes in a first virtual machine on the platform and the second component executes in a second virtual machine on the platform;
- perform validation by the privileged system layer that the second component is authorized to execute at least one service on behalf of the first component, further comprising instructions to:

retrieve a portal index and local name for the second component from an outbound portal connector descriptor of the first component, translate the local name for the second component into a global name for the second component using a using a name translation table maintained by the privileged system layer, retrieve an inbound portal connector descriptor comprising a local name for a source component from the second component, the second component associated with the portal index and translated global name for the second component, translate the local name for the source component into a global name for the source component using a using a name translation table maintained by the privileged system layer, compare the translated global name for the source component to the global name for the first component to ensure a match; and validate by the privileged system layer that the second component is authorized to execute the requested service, further comprising instructions to:

compare a portal validator to an activity descriptor to ensure that the requested service is authorized, wherein the activity description comprises a range descriptor.

10. The machine readable storage medium as recited in claim 9, further comprising instructions that when executed in response to a request for portal connection by the first component to a service in the second component, cause the platform to:

validate the portal communication; and initiate execution of the requested service by the second component.

11. The machine readable storage medium as recited in claim 9, wherein each component has access to a data structure comprising authorized inbound and outbound portal descriptors, wherein the outbound portal descriptor further comprises a local destination component name and an index, the local destination component name and index corresponding to an inbound portal descriptor in a source component, and wherein the inbound portal descriptor further comprises a local source component name and a portal validator, the local source component name corresponding to an authorized source component and the portal validator corresponding to an authorized activity.

12. The machine readable storage medium as recited in claim 11, wherein the performing validation by the privileged system layer, further comprises instructions to translate both the source and destination local names using a name translation table, the name translation table being inaccessible to non-privileged components.

* * * * *